April 25, 1967 G. H. KENDALL, SR., ET AL 3,315,778
MACHINE TOOLS
Original Filed Sept. 18, 1956
10 Sheets-Sheet 1
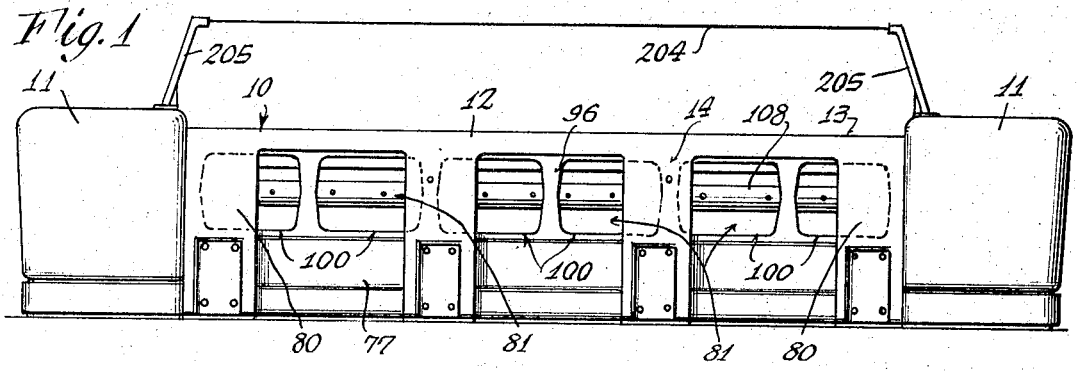
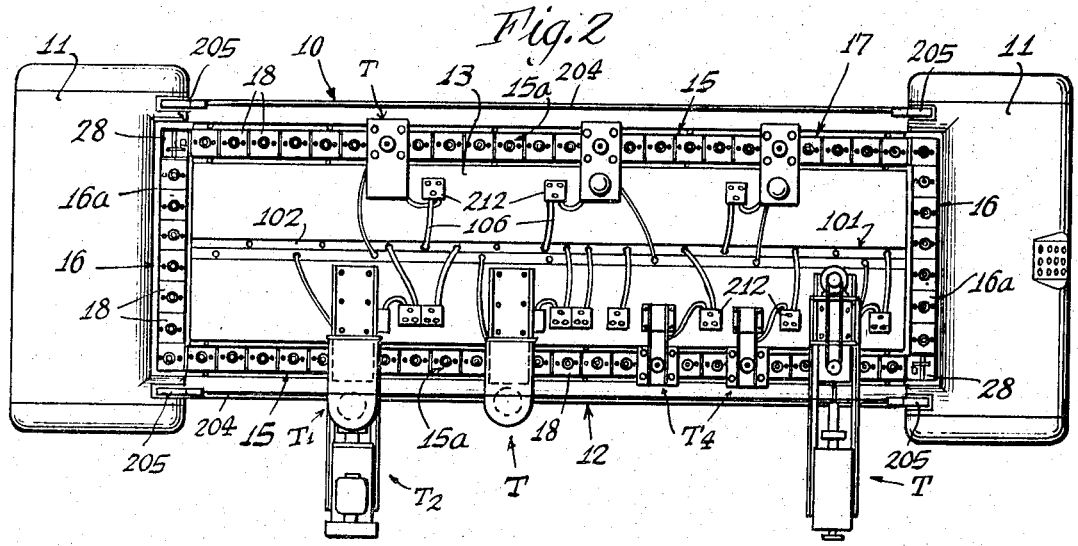
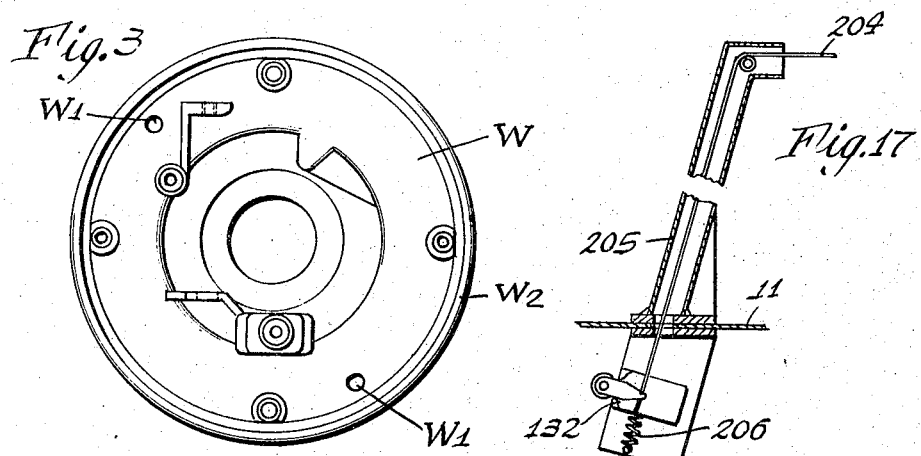
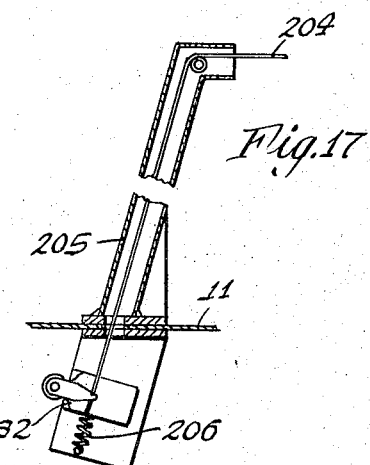
INVENTORS
George H. Kendall, Sr.
Jerry A. Host
Robert E. Ward
George H. Kendall, Jr.
BY Johnson and Kline
ATTORNEYS

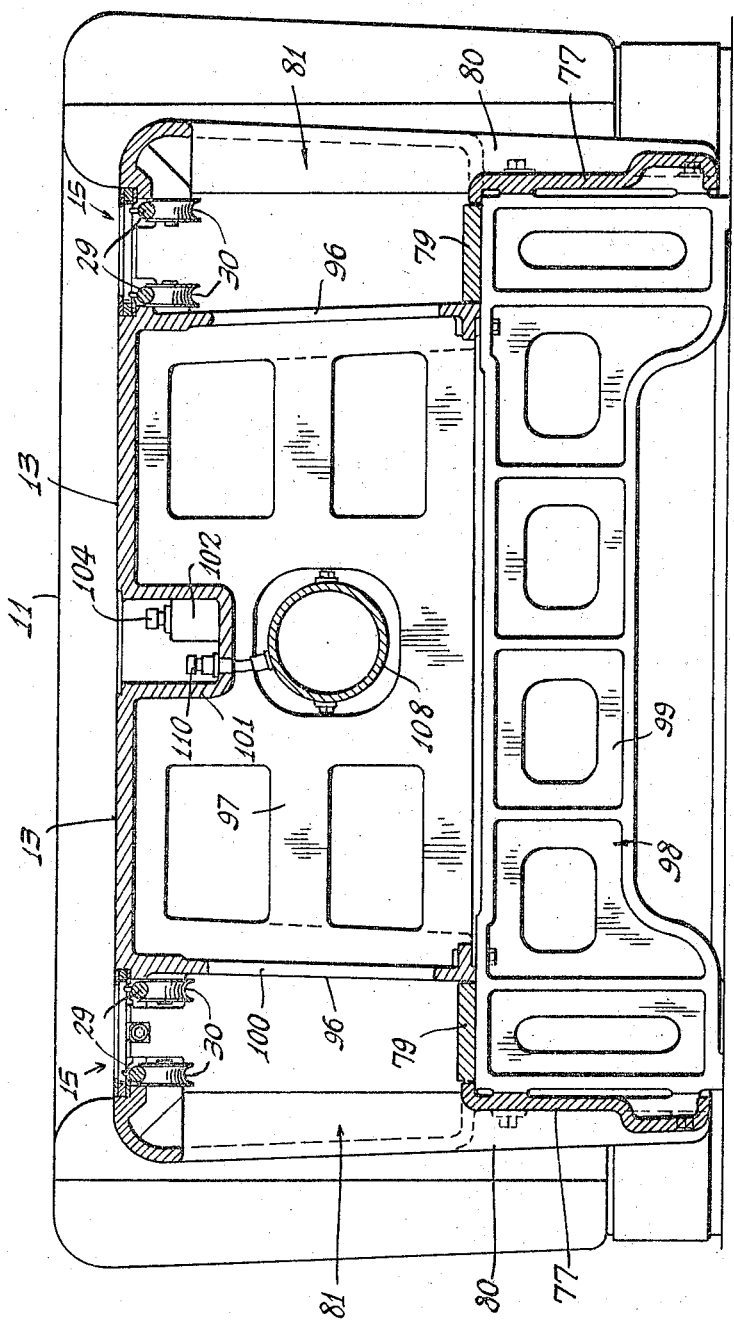

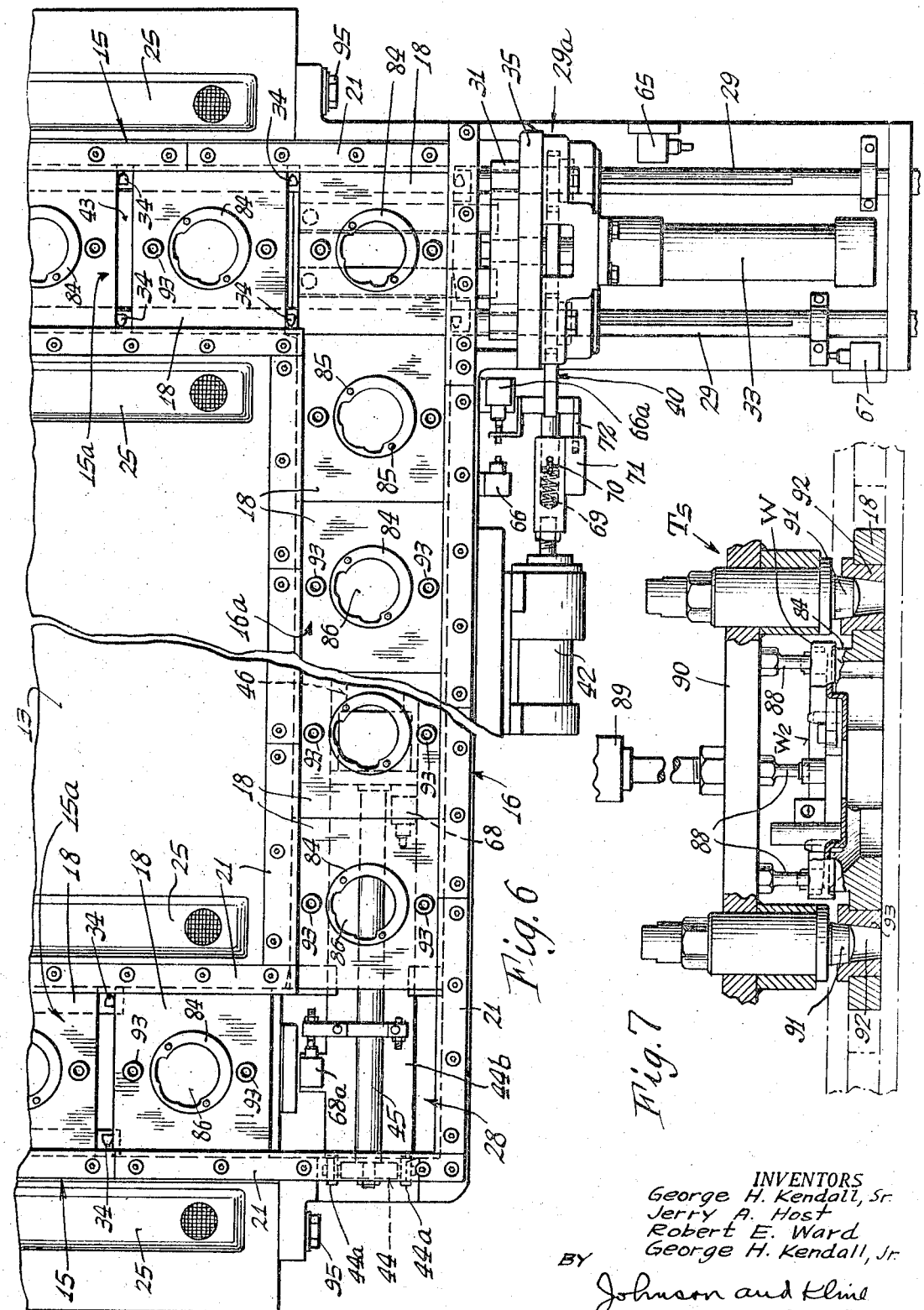

April 25, 1967  G. H. KENDALL, SR., ETAL  3,315,778
MACHINE TOOLS
Original Filed Sept. 18, 1956  10 Sheets-Sheet 5
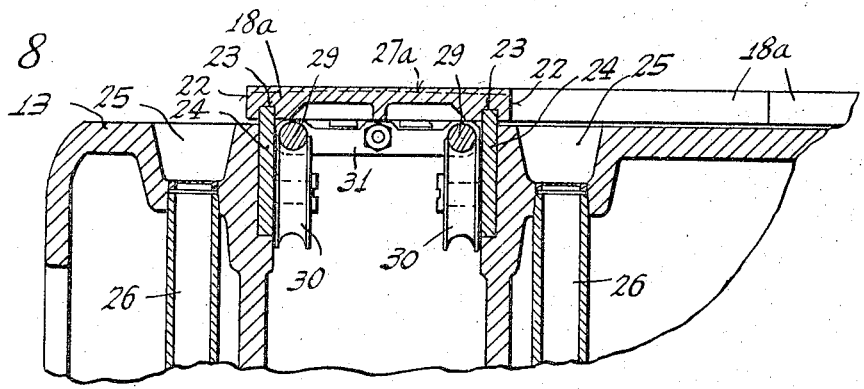
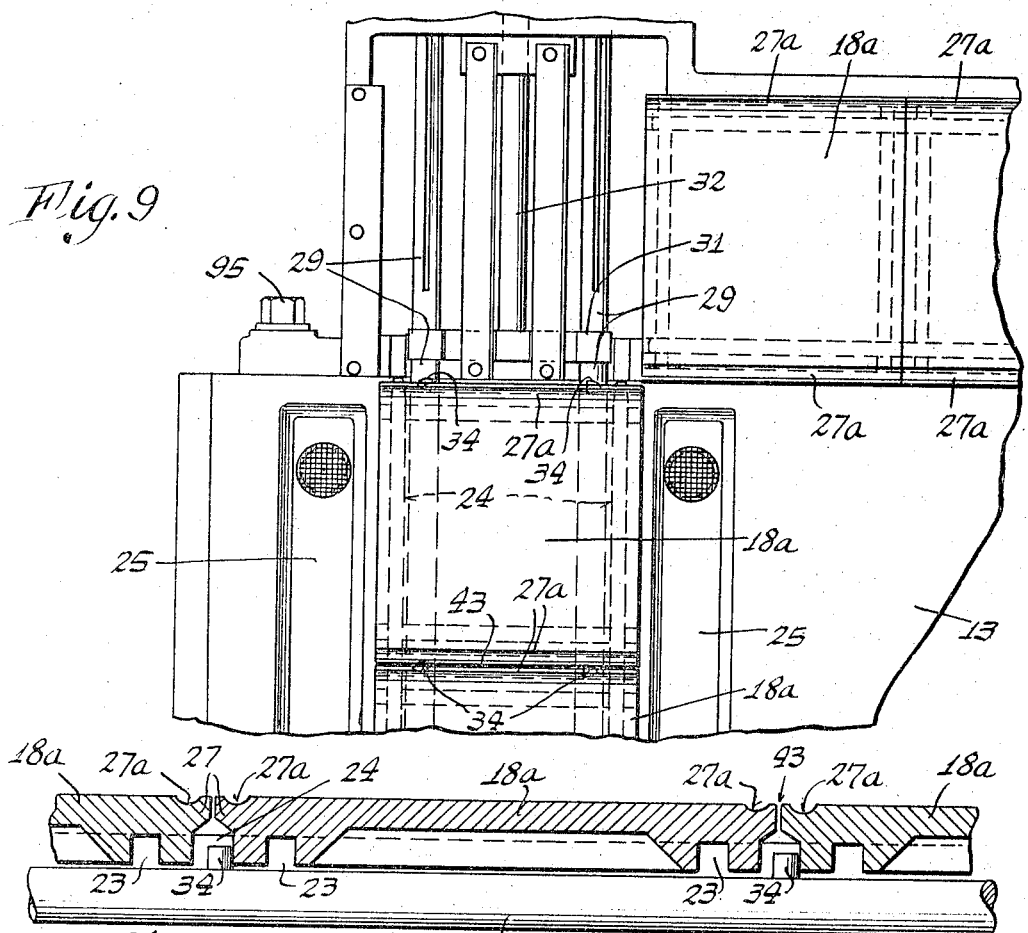
INVENTORS
George H. Kendall, Sr.
Jerry A. Host
Robert E. Ward
George H. Kendall, Jr.
BY Johnson and Kline
ATTORNEYS

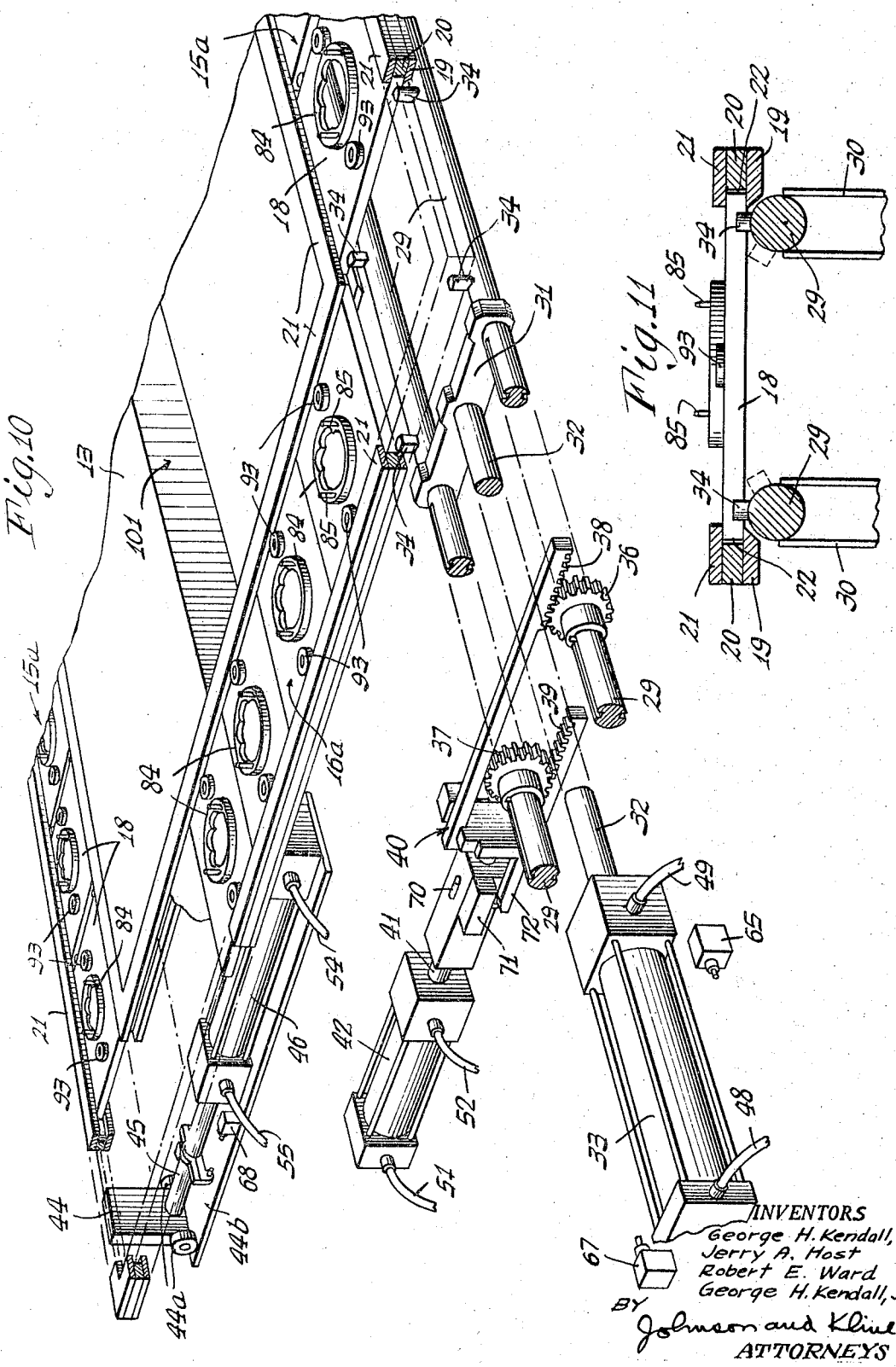

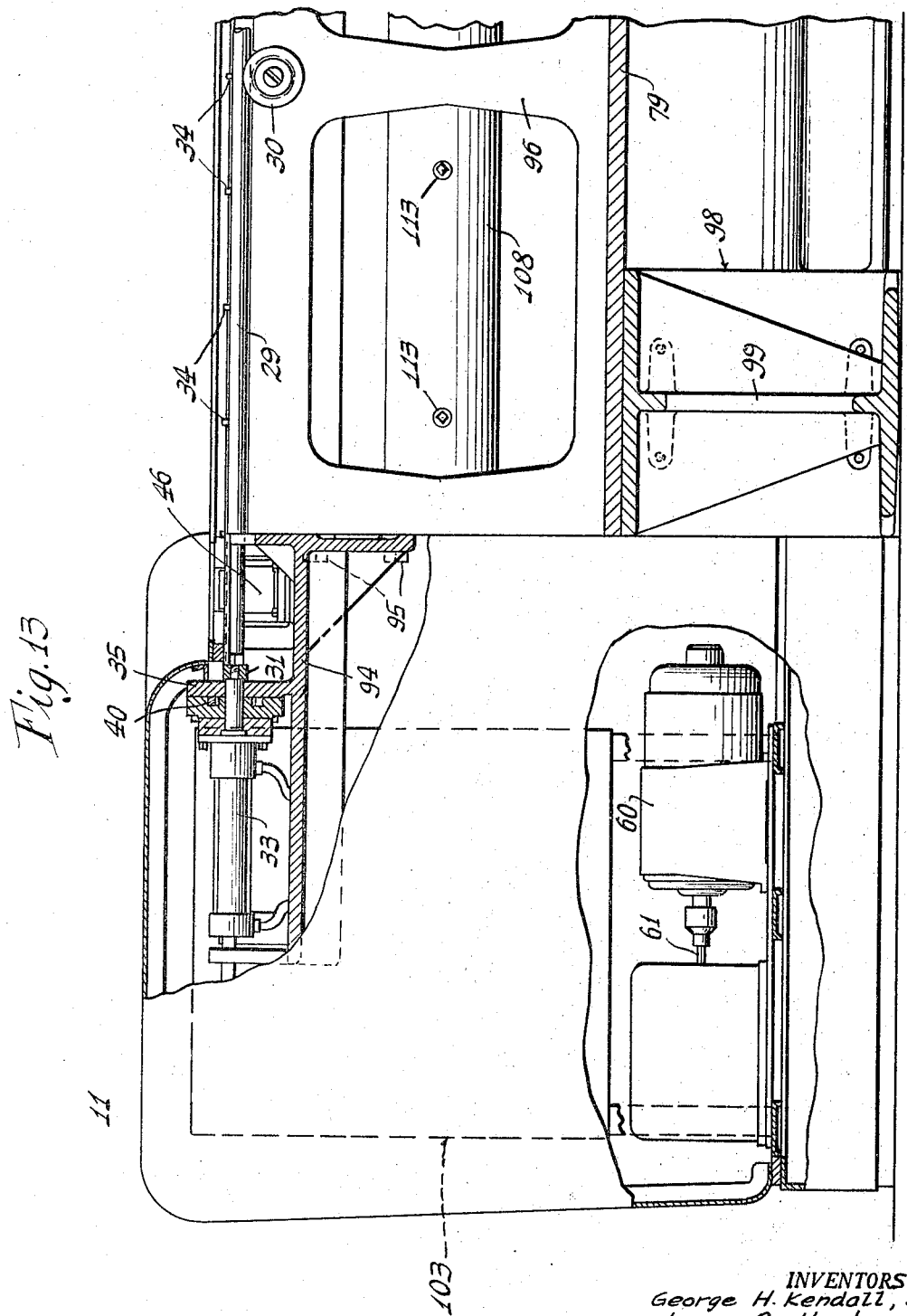

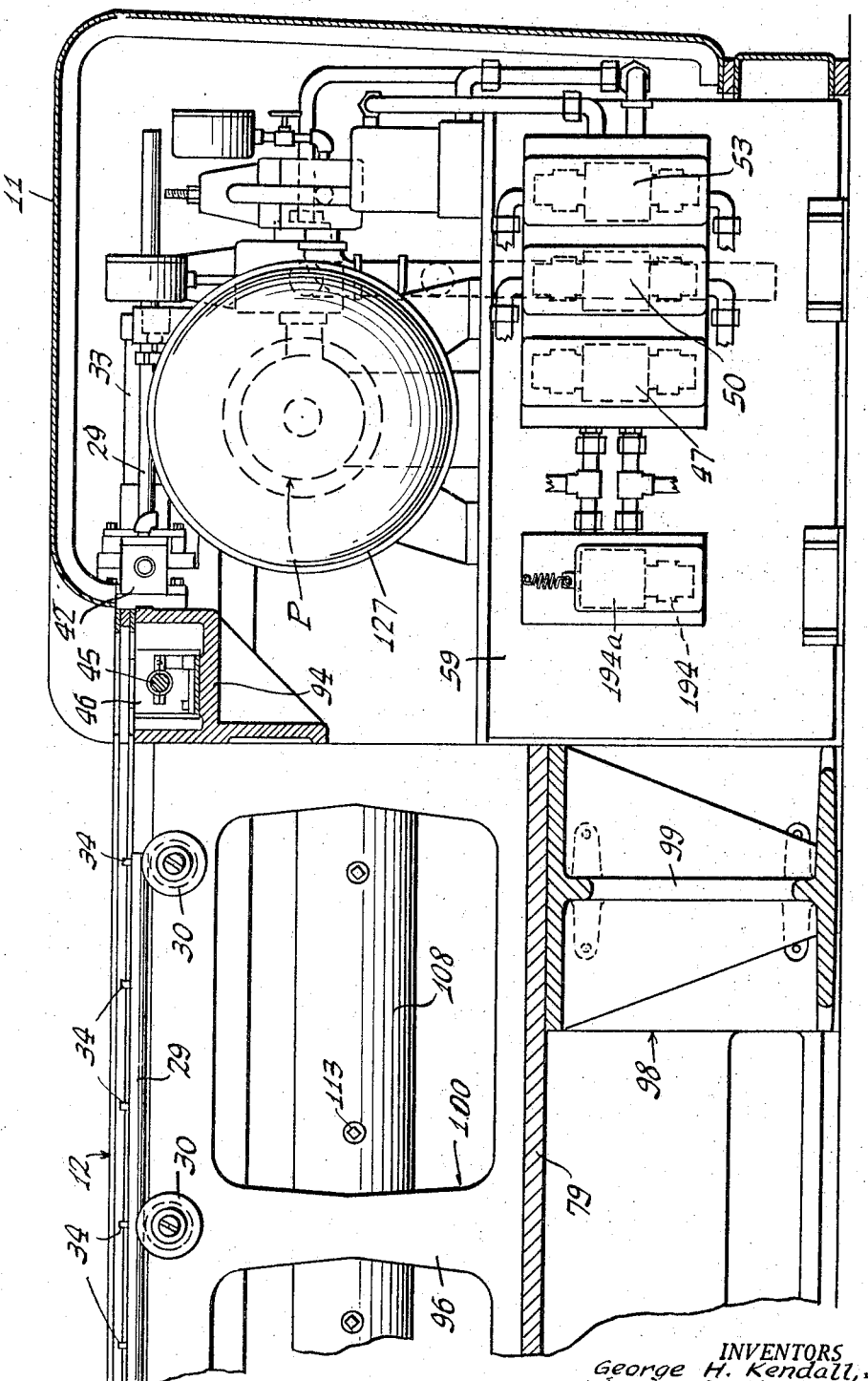

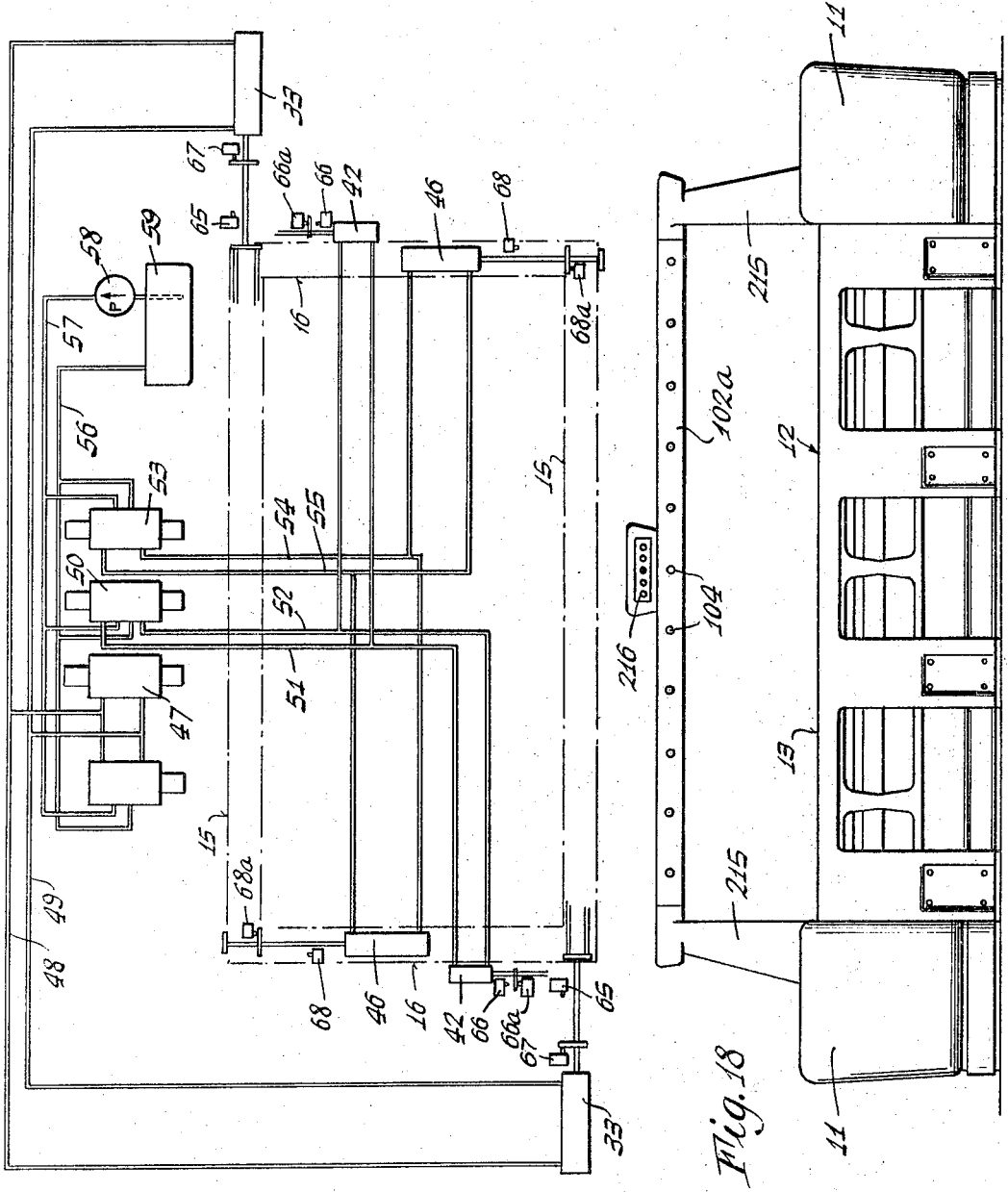

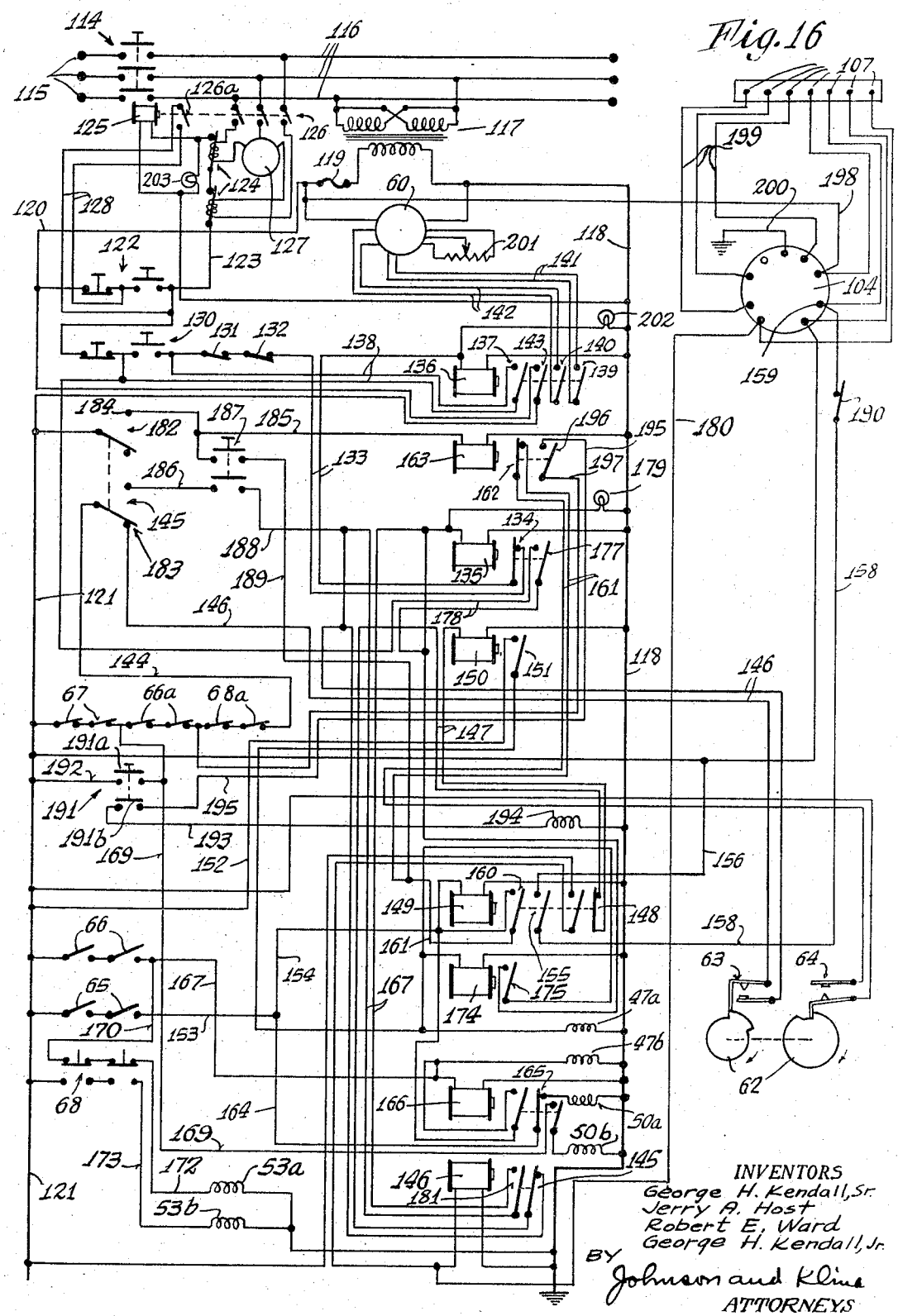

3,315,778
MACHINE TOOLS
George H. Kendall, Sr., Darien, Jerry A. Host, Fairfield, Robert E. Ward, Wilton, and George H. Kendall, Jr., Groton, Conn., assignors to Kenhos Development Pool, Darien, Conn., a co-partnership
Continuation of abandoned application Ser. No. 186,816, Mar. 30, 1962, which is a continuation of application Ser. No. 610,446, Sept. 18, 1956. This application Nov. 25, 1964, Ser. No. 418,944
2 Claims. (Cl. 198—19)

This application is a continuation of our application Ser. No. 186,816, filed March 30, 1962, now abandoned, which is a continuation of our application Ser. No. 610,446, filed September 18, 1956, now abandoned.

This invention relates to machine tools, and more particularly to a multi-station machine tool for performing operations sequentially on a succession of workpieces passing through the machine.

An object of this invention is to provide a basic machine tool having provisions for mounting a large number of tool units of various kinds on working position, built-in facilities for controlling the operation of the tool units, improved means for advancing workpieces progressively and intermittently to successive tool units, timing means for coordinating the operations of the tool units and workpiece-advancing means, and manual and automatic means for controlling the length of time in which a complete cycle of operations is to be performed.

To accomplish this and other objects, the present invention involves many advantageous features, among the most important of which is the provision of a machine having a frame provided with a worktable having a plurality of straight intersecting ways forming a closed track of polygonal form and substantially filling said track with rows of individual work carriers by which the work is advanced step-by-step to successive work stations at which the tool units are mounted to receive the operations required to be performed.

Preferably, alternate rows of carriers around the track are advanced at the same time, after which the other rows are advanced simultaneously. When the machine is so arranged, the rows of carriers fill the stretches of the track except that at alternate intersections around the track one carrier is omitted to provide space to receive the first carrier in the adjacent row.

The track may form a rectangle or other polygonal outline and the work stations may be along any or all sides thereof. Advantageously, however, the track is so formed as to be oblong and the tool units are located along the two long sides, thereby providing adequate space for and easy accessibility to the many tool units sometimes required, the operations being performed both in the long stretch of the track leaving the starting point and the long stretch of the track returning to the starting point.

Since the ways intersect angularly, the work carriers move from one stretch of the track to the next without changing their orientation in relation to the machine as a whole. Therefore, according to the present invention, in each stretch of the track a different side of the carrier and workpiece thereon is presented to tool units along the perimeter of the several stretches of the track, thereby, in many cases, avoiding the necessity of rotating the work carrier and/or the work for this purpose.

In those stretches of the track along which tools are located, the work carriers are advanced step-by-step by power-operated reciprocatory means which includes feed lugs to engage and disengage the carriers individually, and after advancing them leaves them in slightly spaced relation free for slight registering movements which are brought about by cooperating aligning means on the tool units and the work carriers. The work carriers in all stretches of the track may be advanced by this form of reciprocatory mechanism, but in those stretches of the track along which there are no tool units the entire row of carriers may be moved by a single reciprocating advancing means engaging the last carrier in the row.

Another important feature of the invention is the provision of means whereby tool units may be mounted on the worktable of the machine within the outline of the track so that the tools may move outwardly to engage the work or downwardly to engage the work; or the tool units may be mounted outside the outline of the track so that the tools may approach the work from the outside or from the top of the machine.

In addition, the machine of the present invention is preferably so arranged that the tools may engage the work from the underside of the work carriers, and for this purpose and wherever this is to be done, the track is provided with a vertically open space which extends downwardly to a shelf-like rail carried by the frame under the ways and the tool units are mounted on the rail to be directed upwardly toward the work carrier and the work thereon. When this provision is made, the sides of the machine are made so as to be open to give access to the shelf-like rail and tool units thereon for the mounting, inspection and adjustment of tools.

The work carriers of the present invention may have any desired form or shape and may carry suitable jigs and fixtures for receiving and holding the work. Each work carrier is provided with guide surfaces for engaging the ways and said guide surfaces are so formed as to permit the transfer of the carriers from one section of the track to the adjacent section. The carriers may be held normally captive on the ways, in which case the work will be placed on the carrier at a work-loading station. However, in some cases, it is advantageous to have the carriers free of the ways so that they can be lifted off and applied to the ways without the use of tools, thus permitting a defective carrier to be removed at any place along the track to be replaced by a satisfactory carrier. When the carriers are removable either anywhere along the track or at some designated place, extra carriers may be provided whereby a workpiece may be secured to a carrier in advance outside the machine to substitute for a finished workpiece and its carrier at a loading and unloading station.

Another feature of this invention is the provision of improved control means for the tool units including timing mechanism for controlling the sequential operations of the tool units and the work carrier advancing means. Such control means preferably includes means for selectively varying the length for one complete cycle of operations of the machine, and means for manually starting and stopping the operation of the machine, thereby permitting the same basic machine to be retooled for performing other operations without the necessity of completely reorganizing the control mechanism except possibly to change the length of time of a cycle.

Another feature of the present invention is the provision of automatic means whereby the advancement of the work carriers will be interrupted unless each step is completed properly, and also means for stopping the operation of the machine in the event that, for some reason or other, the tool units have not returned to their starting position before the beginning of the next cycle of operations. These safety means include means whereby the machine cannot be restarted without performing a manual operation.

It should be noted that the machine of the present invention may be tooled for performing any operations which can be performed automatically whether they are generally classed as machining, assembling, treating or other operations, and therefore that the term "tool unit" as used herein is intended to include any and all forms of tooling mechanisms operated automatically to perform intended functions.

Other features and advantages will hereinafter appear.

In the accompanying drawings:

FIGURE 1 is a front elevation of the machine tool as it appears before the tool units are attached.

FIG. 2 is a plan view of the machine shown in FIG. 1 illustrating tool units attached to the machine.

FIG. 3 is a plan view of a representative workpiece for which the pallet nests as herein shown by way of example are formed.

FIG. 4 is a transverse section showing the construction of the framework of the machine, and showing the ways for the pallets as gibs.

FIG. 6 is a fragmentary plan view showing one end of the machine, and particularly showing the pallet-advancing mechanism—the parts being shown in the positions which they occupy at the beginning of the cycle of operations.

FIG. 7 is a view partly in section showing a pallet, a workpiece supported thereon, a hold-down device for the workpiece, and registering pins for accurately positioning the pallet in the ways before the work is performed.

FIG. 8 is a fragmentary transverse sectional view of a portion of the machine showing a form of pallet and mounting therefor in which the pallet rides on rails, and showing troughs for collecting coolant, lubricant, chips, etc. resulting from operations of tooling units.

FIG. 9 is a plan view of a corner of the machine showing the parts shown in FIG. 8—the pallets being shown in the positions which they occupy after one row of pallets has been advanced and before the other row of pallets is advanced.

FIG. 10 is a perspective view of one end of the machine showing the pallet-advancing mechanism.

FIG. 11 is a transverse sectional view through one of the ways showing the pallet-advancing rods with their feed lugs engaging the pallet, and showing in dotted lines the position of the feed lugs disengaged, as during the return movement of the feed rods.

FIG. 12 is a longitudinal section through the pallets showing the feed rods with the feed lugs engaging the pallets, and showing grooves for guiding coolant, chips, etc. to the collecting troughs.

FIG. 13 shows one end of the machine with some of the parts broken away and other parts shown in section.

FIG. 14 is a view similar to FIG. 13, but showing the other end of the machine.

FIG. 15 is a diagrammatic view showing the hydraulic system for operating the pallet-advancing means and indicating diagrammatically the positions of the switches for controlling the solenoid valves which in turn control the cylinders and pistons for operating parts of the pallet-advancing mechanism.

FIG. 16 is an electrical diagram showing the various switches, relays and other electrical units incorporated in the machine.

FIG. 17 is a vertical section showing the safety switch cable and its mounting means.

FIG. 18 is a front elevation like FIG. 1, but showing an overhead arrangement for the conduit and plug receptacles forming part of the electrical system.

Figure 5:
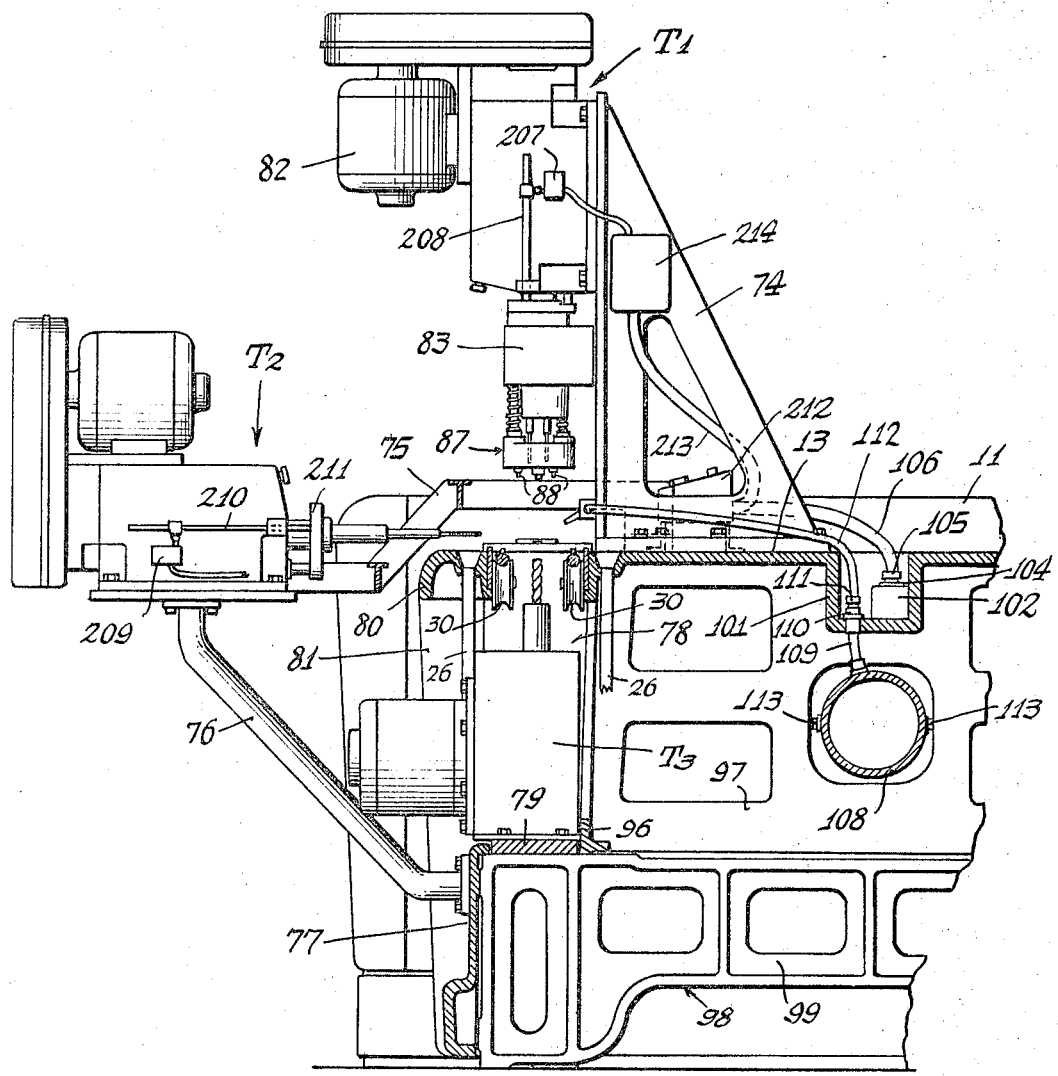
FIG. 5 is a transverse section through the machine showing representative tool units mounted in position above, outside and below the pallets and the workpieces thereon.

The machine of this invention comprises a frame 10 which has end sections 11 and intermediate sections 12 of such length, and as many, as may be required to supply the desired working space. The frame 10 has a top or deck 13 and a vertical supporting structure 14 forming a base adapted to rest on the floor or other foundation.

As shown in FIG. 2, the deck 13 is provided with straight ways 15 on its long sides angularly intersecting straight ways 16 on its shorter sides. The ways form an oblong rectangular track 17 on which work carriers or pallets 18 may travel, and along which tool units T may be operated on or in connection with workpieces carried by the pallets 18. The ways 15 and 16, as shown in FIGS. 2, 4, 6, 7, 10 and 11, may be in the form of gibs and comprise bottom rails 19 having spacers 20 and top flanges 21. The pallets 18 are preferably rectangular, usually square, and have their lateral edge portions 22 confined between the rails 19 and flanges 21 with the spacers 20 engaging the edges of the pallets to limit the lateral movement thereof.

When it is desired to provide for the removal and replacement of the pallets on the track, the flanges 21 or parts of them may be omitted. For instance, when it is desired to attach the workpieces to the pallets outside the machine, the flange 21 may be omitted at a loading and unloading station along the track to permit the pallets with finished work to be lifted from the track and other pallets to which unfinished work is attached to be placed in position on the track.

When the machine is to be tooled to perform operations involving the use of lubricants or coolants or machining operations involving the productions of chips or shavings, it is preferred to employ the arrangement shown in FIGS. 5, 8 and 9, wherein the pallets 18a are provided on their undersides with grooves 23 inwardly spaced from their lateral edges 22 to receive and ride upon vertical rails 24 forming the track 17. In this way, any extraneous matter, such as chips, etc., is prevented from lodging between the rails and the pallets. Besides, liquids such as lubricants or coolants may flow over the edges 22 of the pallets to be conveniently collected and disposed of.

As shown in FIGS. 8 and 9, the collection of the liquids used and chips made in the performance of operations of the machine is accomplished by providing troughs or channels 25 in the worktable 13 of the machine parallel with and adjacent the track 17 or portions thereof. Thus, liquid flowing off the pallets or chips falling therefrom will fall into the troughs 25 and be collected by conduits 26 leading to a suitable receiver and separator, not shown.

To further avoid the depositing of chips etc. on the rails 24 and to control liquids which may be deposited on and flow off the pallets, the latter may be provided along their leading and/or trailing lateral edges with flanges to substantially reduce any space existing between the adjacent pallets in a row. As shown in FIG. 12, this may be accomplished by providing on two opposite edges of the pallets 18, flanges 27 which substantially bridge the space between leading and trailing edges of adjacent pallets leaving only sufficient space to permit relative registering movements of the pallets for purposes explained below. The flanges 27 may have parallel grooves 27a inclined downwardly and away from the center of the pallet to cause liquids to flow toward the troughs 25 rather than over the edges of the flanges 27.

According to the present invention, there are enough pallets 18 on the ways 15 and 16 to completely fill the rectangular track 17 (except for certain intersections of the ways) so that there are continuous rows 15a and 16a of pallets in the ways 15 and 16 respectively to be advanced along the track.

Various means for advancing the rows of pallets step-by-step on the several ways may be employed. However, to reduce the time during which the advancing movements take place, it is advantageous to advance opposite rows of pallets simultaneously and alternately with the other rows. When the track is oblong, as shown in FIG. 2, and the pallets are to be advanced counter-clockwise, at one position of rest between working cycles of the tools the pallets are omitted at the diagonally opposite corners 28 of the track. The rows 15a of pallets are first advanced simultaneously so that the leading pallets move into alignment with the rows 16a. This operation causes spaces to be left behind the trailing pallets in the rows 15a. Then the rows 16a are advanced simultaneously to move the leading pallet in the row 15a and complete the step-by-step movement of all the pallets.

Suitable reciprocatory means may be employed for advancing the rows of pallets 15a and 16a alternately, but it is preferable to have each row of pallets advanced by its own individual mechanism, and as shown herein, the means for advancing the pallets on the ways 15 are alike and the means for advancing the pallets on the ways 16 are alike.

Referring to the rows 15a, as shown in FIGS. 6, 10 and 11, parallel with and located in a space below each pair of rails is a pair of rigid feed rods 29 mounted on rollers 30 carried by the frame of the machine. The rods 29 extend at one end through guide plates 29a beyond the track 17 into the adjacent end section 11. The rods 29 are connected by a crossbar 31 which in turn is connected to an operating rod 32.

The feed rods 29 may be operated by any suitable means such as mechanical means in the form of a cam and follower, or electrical means in the form of a field and armature, or hydraulic means such as a piston and cylinder.

For purposes of illustration, the rod 32 as shown herein is secured to the end of a piston located in a cylinder 33 to be operated by a suitable source of fluid under pressure by which the rods 32 are advanced longitudinally a predetermined distance and returned. Each of the rods 29 is provided with a plurality of spaced feed lugs 34 which extend up into the space between adjacent pallets 18. When the lugs 34 are so positioned and the rods 29 are advanced, the entire row of pallets 15a in the ways 15 will be advanced simultaneously, but each pallet is advanced individually in spaced relation with adjacent pallets.

The longitudinal spacing between the lugs 34 on each rod is preferably equal to the length of a pallet plus the space to be left between pallets, and the stroke of the piston rod 32 and the feed rods 29 is substantially equal to the longitudinal spacing between the lugs 34—the forward movement of the feed rods 29 being limited by the engagement of the foremost pallet in the row 15a with the ways 16 and the return movement of the feed rods being limited by a stop 35 on the frame of the machine. The reciprocating movements of the piston rod 32 are controlled by switches referred to below.

In addition to moving longitudinally, each feed rod 29 is rotated, having a rotatable bearing in the crossbar 31 and guide plate 29a, so that the lugs 34 may move out of engagement with the pallets to the position shown in dotted lines in FIG. 11 before the return strokes of the piston rod 32 and feed rods 29 take place. For the purpose of rotating the rods 29, the latter are provided with gears 36 and 37 to be engaged by teeth 38 and 39 respectively on opposite sides of a gear rack 40 which in turn is connected to a piston rod 41 of a cylinder 42. Instead of being connected to a piston rod 41 and a cylinder 42, the gear rack 40 may be operated mechanically or electrically operated if desired.

When the piston rod 41 moves to the left as viewed in FIG. 10, the gear 36 and its rod 29 and lugs 34 are rotated counterclockwise and at the same time the gear 37 and its rod 29 and lugs 34 are rotated clockwise, thus moving the lugs 34 downwardly and toward each other to disengage the pallets 18. When the lugs 34 have been released from the pallets, the rods 29 may be moved to the left to the position shown in FIG. 10, leaving the pallets in the row 15a in the positions to which they have been advanced.

After the rods 29 are returned to starting position, the rack bar 40 is automatically operated to rotate the rods into pallet-engaging position as will be explained below.

To facilitate the entrance of the lugs 34 in the spaces between the pallets the lugs may as shown in FIGS. 10 and 11 be beveled off to form a wedging surface on their sides which approach the pallets.

After the lugs 34 have disengaged the pallets, aligning means, described below in connection with the tool units, position and hold the pallets at the work stations and such positioning is provided for by spaces 43 between the pallets in the rows 15a provided by the previous presence of the lugs 34 between adjacent pallets and by the loose fit between the pallets and the ways.

It should be noted that the provision by the present invention of the rigid feed rods 29 with their fixed and spaced feed lugs 34 assures the continued proper positioning of the pallets and the work carried thereby with relation to the tools units T to which the work is brought, and that there is no opportunity for the spacing between the feed lugs to be changed or the length of the advancing movement to vary which is liable to occur with other forms of feed mechanisms.

If critical alignment beween the pallets and work carried thereby and tool units in the rows 16a is required, the advancing mechanism just described in connection with the rows 15a may be duplicated for the rows 16a.

However, in the machine as illustrated herein it is not intended that work requiring critical alignment with tool units be performed in the ways 16, and therefore it is not necessary to individually advance and control the pallets in the rows 16a. Accordingly as shown the pallets in the rows 16a may be advanced step-by-step by each pallet pushing the next. This may be accomplished for each row 16a by means of a lug 44 mounted on a piston rod 45 of a hydraulic cylinder 46 which is so positioned as to engage the last or end pallet 18 in the row 16a as shown in FIG. 10 in dotted lines and advance the entire row 16a of pallets when fluid pressure is applied in the cylinder 46. The lug 44 and piston rod 45 may be supported in any suitable manner, but as shown the lug 44 is provided with rollers 44a riding on a plate 44b secured to the frame of the machine.

The advancement of the rows 16a causes the leading pallets therein to be moved into the rows 15a ahead of the first pairs of lugs 34 to be engaged and advanced thereby when the rods 29 are again operated.

Since the pallet-advancing mechanism shown includes cylinders and pistons, the present invention provides valve mechanism for operating the pistons and controlling their direction of movement.

Accordingly, as shown in FIG. 14 (see also FIG. 15), there is provided a double-acting valve 47 connected by pipes 48 and 49 to the cylinders 33, another double-acting valve 50 connected by pipes 51 and 52 to the cylinders 42, and still another double-acting valve 53 connected by pipes 54 and 55 to the cylinders 46. The valves 47, 50 and 53 are connected by pipes 56 and 57 to a pump 58 and a sump 59 respectively. The valves 47, 50 and 53 may be operated by any suitable power, electrical, mechanical or hydraulic, but it is preferable for simplicity and economy to operate them electrically, and they are, therefore shown as solenoid operated valves. Each of the valves 47, 50 and 53 is a two-position valve applying fluid under pressure to opposite sides of its associated pistons in its opposite positions.

As will be more fully explained below, the advancing movement of the pallets is initiated by timing mechanism incorporated in the machine and arranged to be effective after the lapse of sufficient time for completion of all the particular tool operations to be performed.

In the form of the invention shown, the timing mechanism starts the movement of the feed rods 29 in pallet-advancing direction and thereafter the successive operations are performed sequentially and independently until the advancement of all of the pallets is completed.

As will appear below, certain interlocks or sensing devices are provided by the present invention to stop the operation of the machine in the event of malfunctioning of any of the sequential operations or the failure of the tool operations to be completed as intended within a predetermined time interval.

The timing mechanism shown comprises a variable speed motor 60 mounted in one of the end sections 11. The motor 60 is geared to a shaft 61 on which there is mounted a disk 62 for controlling contacts 63 and 64 which, when closed at a predetermined period in the cycle of operations of the shaft 61, causes the solenoid valve 47 to move to position to apply fluid under pressure through the pipes 48 to the cylinders 33 and advance the rows of pallets 15a. When the leading pallets in the rows 15a reach their limit of movement properly aligned with the ways 16, the piston rods 32 (see FIG. 6) engage and close switches 65 at diametrically opposite corners of the track 17. The closing of both switches 65 (which are in series) energizes the solenoid valve 50 to apply fluid pressure to the cylinders 42 through pipes 52 to cause the rack bars 40 to operate to swing the feed lugs 34 down and away from the pallets.

At the same time the switches 65 cause a circuit leading to the solenoid valve 53 to be closed to apply fluid pressure to the cylinder 46 through the pipes 55 to operate the feed rods 45 to advance the pallets in the ways 16a.

When the feed rods 29 have completed their rotation to swing the lugs 34 clear of the pallets, the rack bars 40 engage switches 66 to close a circuit leading to the solenoid valve 47 to cause fluid under pressure to flow through pipes 49 and cause the cylinder to return the feed rods 29 to starting position.

Upon the feed rods 29 reaching starting positions, switches 67 operated by the piston rods 32 close a circuit to the solenoid valve 50 connected by pipes 51 to cylinders 42 which operate the rack bars 40 to rotate the feed rods 29 and position the lugs 34 between the pallets in the rows 15a.

The feed rods 45 for the cross feed of the pallets are immediately automatically and independently returned by the engagement of rods 45 with switches 68 leading to the solenoid valve 53 connected by the pipes 54 to the cylinder 46 for moving the lugs 44 to starting position.

Upon return of the feed rods 45 to normal position switches 68a are closed and the return of the rack bar 40 to normal position closes switches 66a.

Referring to the form of ways shown in FIGS. 4, 6 and 10 in which the pallets are confined to the track by flanges 21 to avoid malfunctioning of the machine or breaking of the parts in the event of some manual disturbing of the pallets or some other reason the lugs 34 cannot enter the spaces between the pallets, the rack bar 40 may be connected to the piston rod 41 by a yielding telescopic connection shown in FIGS. 6 and 10, in which a spring 69 is placed between the rack bar 40 and the piston 41. The relative movement between these parts is controlled by a pin-and-slot connection 70. Should the lugs 34 be prevented from moving upwardly to proper position and the rack bar 40 be thus prevented from moving, the continued movement of the piston rod 41 will cause the operation of a switch 71 in a circuit which will stop the operation of the entire machine. The switch 71 is carried by a block secured to the piston rod 41 and is operated by an arm 72 carried by a rack bar.

When the pallets, such as the pallet 18a shown in FIGS. 8 and 9, merely rest on the rails and are not confined thereto, the pin-and-slot connection 70 between the rack and piston may be omitted along with the switch 71, since, if the lugs 34 do not properly align with the spaces between pallets, they will merely raise the pallet off the rails slightly. The next advancing operation will jog the pallet back into position on the lugs.

The tool units T may be made to operate at the completion of the advancement of all the pallets. However, to reduce the time required for one complete cycle of the operations of the machine, it is preferable to start the operation of the tool units as soon as the pallets in the rows 15a have been advanced. Therefore, as shown herein, the switches 65 which are operated by the rods 29 in the rows 15a when they complete their advancing movements close a circuit referred to below which starts the operation of the tool units.

The tool units T may, according to this invention, be mounted on the frame 10 anywhere along the tracts 17, if desired, to operate upon the workpieces carried by the pallets 18 or assemble components of an article thereon. However, when, as shown in FIGS. 1 and 2, the machine is oblong, it is preferable and advantageous to mount the tool units T only along the long ways 15a, since sufficient space for the tool units is usually available and they can be easily reached by a mechanic from both long sides of the machine for installation, adjustment and inspection. Such an arrangement is shown in FIG. 2, in which representative tool units T are placed in proper order to perform machining operations on workpieces carried by the pallets 18 as they are brought successively to the positions of the tool units, i.e. to work stations.

The tool units T may be of any suitable or required kind depending on the work to be done and, according to the present invention, may be conveniently mounted on the frame of the machine in any desired position relative to the outline of the pallet track 17. The tool units may be mounted on the deck 13 inside the track 17 as, for instance, the multiple drilling unit T1 shown in FIG. 5 which is mounted on a bracket 74 bolted to the deck 13 and operates downwardly on the workpieces.

The tool units T may also be mounted on the frame to be located outside the track 17 as shown in FIG. 5, wherein the horizontal tapping unit T2 is supported by a bracket 75 secured to the deck 13 and a brace 76 secured to the side rail 77 at the lower portion of the frame of the machine.

In addition, according to the present invention, the tool units may be located below the track 17 to operate upwardly on the workpieces carried by the pallets. For this purpose, the frame of the machine is provided with a deep open space or channel 78 directly under the pallets. At the bottom of the channel 78 there is provided a horizontal longitudinally extending shelf 79, see FIG. 5, on which tooling units such as the boring tool T3 may be mounted to approach the workpiece carried by the pallet from the bottom and operate upwardly on the same. To provide a clear space in the channel 78 for such tool units, the feed rods 29 are, as shown, located close to the rails forming the track 17.

In order to give free access to the channel 78 for the installation, adjustment and inspection of tool units mounted on the shelf 79, the side members 80 of the frame on the long sides thereof have openings 81 shown in FIGS. 1 and 5.

Tool units T may also be mounted on the deck 13 to operate horizontally on the workpieces and approach the latter from the inside of the track 17 or downwardly.

Since the pallets do not change the position at the corners of the track travel without changing their orientation with reference to the machine as a whole, the side of a pallet and workpiece facing the inside of the track in one of the ways 15a will be facing the outside of the track in the other of the ways 15a, and thus either side of the workpiece may be reached by tooling from either the inside or the outside of the track.

The tool units T may be of any suitable type and may be operated in any desired manner. As representative of the type of tool units well suited for use with the machine of the present invention, the tool units T1, T2 and T3 shown in FIG. 5 are of the self-propelled, self-powered type comprising an electric motor 82 which supplies the power to rotate or otherwise drive the tool bit, tap or the like, and also to advance and retract a carriage 83 for the same.

The tool units T may also include testing and checking tools, such, for instance, as the tool units T4 shown in FIG. 2, the details of which form no part of the present invention.

The pallets 18 may have means to receive, locate and/or clamp a workpiece on itself in the case of the machine being used for machining operations, or suitable holders or receivers for component parts in the case of the machine being used for assembling operations.

Usually, because of the special provisions made by the present invention, it is sufficient in a case of machining operations to provide each pallet with a work-holding nest 84, such, for instance, as shown in FIGS. 6, 7 and 10, which is shaped to fit a workpiece W, such as shown in FIG. 3, to be machined. Since in the present instance the workpiece W has performed pilot holes W1, the nests 84 are provided with locating pins 85 to be received by the pilot holes W1 in the workpiece.

When, as in the present instance, work is to be performed by tools such as the tool unit T3 operating from the underside of the workpiece, each nest 84 is provided with a central hole 86 to give access to the work by the tool. The pins 85 on the nests 84 not only locate the workpiece relative to the pallet, but may also prevent the workpiece from rotating in the nest.

It should be understood, of course, that the work nests 84 will be formed differently for different shaped workpieces according to known practices in making jigs and fixtures.

To avoid the necessity of clamping each workpiece in its nest against upward movement therefrom, there is associated with or formed as part of each tool unit T a hold-down device 87 which engages the workpiece at the work station and holds it against being lifted out of the nest. As shown in FIG. 5, a suitable hold-down device 87 may comprise a spring-pressed pad having one or more projections 88 so positioned as to engage the workpiece in the nest before the tool engages the workpiece and to remain in engagement with the work until the tool has been retracted. The hold-down pad may, as shown in connection with the tool unit T1 of FIG. 5, be mounted on the carriage 83 for the tools.

In the case of tooling units in which tools do not approach the workpiece from above, a separate hold-down tool unit, such as the tool unit T5 shown in FIG. 7, may be employed. As shown in FIG. 7, the hold-down unit includes a hydraulic operator 89 connected to a slidable plate 90 which carries on its underside the hold-down pins 88 positioned to engage the flange W2 of the workpiece W for instance, when the plate 90 is moved to operative position. Such hold-down units as the unit T5 are conveniently mounted on the deck 13 inside the track 17 as shown in FIG. 2, and are used with such tooling units as units T2 and T3 shown in FIG. 5, but the illustration thereof in FIG. 5 is omitted for the sake of clarity.

Associated with each tool unit T are aligning means for moving the pallets carrying a workpiece to be operated upon by that tool unit into accurate registration with the tools thereof. These aligning means are preferably carried by the hold-down pads 87 as shown in FIG. 5, or the hold-down unit T5 as shown in FIG. 7 to which reference should be had. They comprise tapered pins 91 which, as shown, enter tapered holes 92 in bushings 93 mounted in the pallet and accurately located with reference to the work nests 84. When the tapered pins 91 enter the tapered holes 92, the pins will move the pallets if necessary to proper position and hold them thus until the tapered pins are withdrawn. This aligning and registering movement of the pallet is permitted because by the time that the tapered pins 91 engage the tapered holes 92, the feed lugs 34 located between the pallets have been withdrawn and the pallets are free to shift in the direction of feed. The pallets also have slight freedom of transverse movement, since the grooves 23 in the pallets 18a are slightly wider than the rails 24 and the width of the pallets 18 is slightly less than the space between the spacer 20 in the form shown in FIG. 11.

The aligning pins 91 are so located that they engage the tapered holes 92 in the pallets before the hold-down pins engage the workpiece and also before the tools are in position to operate upon the workpieces.

As shown in FIGS. 6, 13 and 14, the intermediate sections 12 which are adjacent the end sections 11 have frame sections 94 secured thereto by bolts 95. The sections 94 support the outer rails of the sections 16 of the track 17 and the cylinders and other parts of the pallet-advancing means and the controlling means therefor. Thus, the track 17 may be assembled on the intermediate sections without regard to the end sections 11 which thereafter may be put in position and secured to the intermediate sections.

The frame 10, as shown in FIGS. 1, 4, 5, 13 and 14, in addition to the top plate 13, comprises side plates 96 and cross plates 97 which rest upon and are secured to base units 98 adapted to rest on the floor or other suitable foundation. The base units shown in FIG. 13 are of generally I-beam construction and have reinforcing ribs 99. Extending across the machine and secured to the base units are the side plates 80 which extend up to the level of the table 13 and there serve as the support for the outer rails of the sections 15 of the track. The base units 98 extend beyond the sides 96 of the table and it is on these extending portions of the base 98 that the shelf 79 is secured. As stated above, the side plates 80 have openings 81 giving access to the space under the sections 15 of the track. Also, the sides 96 have openings 100 to give access to the space under the worktable 13.

The present invention makes provision for the convenient connection of the tool units T to operating and controlling circuits and to a source of compressed air. As shown in FIGS. 2, 4 and 5, the top plate 13 forming part of the worktable is provided with a longitudinally extending channel portion 101 midway between the long sides of the machine. Within the channel 101 there is located below the surface of the top plate 13 a conduit 102 for the wires and cables leading from the terminal board 103 in the end section 11 of the machine. At intervals along the conduit 102 there are multiple wire receptacles 104 adapted to receive attachment plugs 105 connected to cables 106 leading to the tool units, as shown in FIG. 5 in connection with the tool unit T1 as representative of the arrangement. The plug receptacles 104 are preferably uniformly spaced along the conduit 102 without regard to the location of the particular tool units employed, since the cables 106 may have the necessary length to reach the tool units from the most convenient receptacle. The coded wires from each receptacle 104 pass through the conduit where they are connected to terminals 107 at the terminal board 103 further referred to below.

To supply compressed air or other fluid conveniently to the tool units, the machine of the present invention is provided with a large pipe 108 which extends longitudinally for approximately the full length of the frame between the ends 11. The pipe 108 preferably serves not only as a conduit and manifold, but also as a reservoir for the fluid. The pipe 108 is preferably located below the channel member 101 and has connected to it pipes 109 extending through holes in the channel and terminating in coupling members 110 located in the channel to receive companion coupling members 111 on flexible pipes 112 leading to the tool units or to the vicinity thereof as shown in FIG. 5. The pipe 108 also has coupling members 113 attached directly thereto and accessible through openings 81 and 100 in the side plates 80 and 96 respectively to receive companion coupling members connected to flexible pipes leading to tool units located below or outside of the track 17.

The present invention provides a simple and efficient arrangement for controlling and interlocking the circuits leading to the pallet-advancing means and the tool units whereby successive operations are started and completed in sequence and in timed relation; and if not, the operations are automatically stopped and cannot be restarted until the fault has been cured and a restarting switch operated.

This is accomplished by the use of switches and relays which will be described in connection with the wiring diagram, FIG. 16, in which the switch 114 is operated to connect a three-phase high voltage line 115 to a three-wire system 116 in the machine. Across two of the wires 116 there is a transformer 117 for supplying lower voltage current to the relays, solenoid valves and tool units. Current from one side of the transformer 117 flows through a common lead return wire 118 while current from the other side of the transformer, after passing through a fuse 119, flows to common leads 120 and 121. The lead 120 is connected by a stop-and-start switch 122 through a lead 123, overload switches 124 to a relay 125 connected to the return lead 118 to energize the relay. When the relay 125 is energized, a switch 126 closes the three-wire circuit 116 to a motor 127 which operates the pump P to produce the hydraulic pressure required to operate parts of the machine. At the same time, switch 126a closes a holding circuit 128 which keeps the relay 125 energized until the stop button of the switch 122 is operated.

When the transformer 117 is energized, current therefrom is fed to a variable speed motor 60 for the timing mechanism. However, the motor 60 does not start until another manual operation is performed.

Closing of the switch 126a causes current to flow to a start-and-stop switch 130 which when operated closes a circuit including safety switches 131 and 132, wires 133 and a normally closed switch 134 of a relay 135 to a main relay 136 to energize the same.

Relay 136 closes a switch 137 in a holding circuit 138 around the start button of the switch 130. The relay 136 also closes switches 139 and 140 connected by wires 141 and 142 to the timing motor 60. The relay 136 also closes a switch 143 which connects the common leads 120 and 121 to feed current to the other units of the system.

When these operations have been performed, if the machine is in proper condition to start operating, i.e., the tool units are in starting position and the automatic switches 66a, 67 and 68a are closed, the operation of the timing motor 60 will cause the switch 63 to close. When this occurs, current flows from the feed line 121 through switches 66a, 67 and 68a, wire 144, switch 145 referred to below, wires 146 through switch 63, wires 147 through a normally closed switch 148 of a relay 149 to a relay 150 to energize the same and cause a switch 151 to be closed. This causes current to flow from the feed line 121 through wire 152 to the solenoid coil 47a which causes the pallets in the rows 15a to be advanced, and when the advancement is completed switches 65 are closed to initiate the operation of the tool units and complete the next step in the advancing of the pallets.

Closing of the switches 65 causes current to flow from the feed line 121 through the wires 153 and 154 to the relay 149 to energize the same and this causes the switch 148 to open and relay 150 to drop out opening the circuit to the coil 47a of the solenoid valve 47. At the same time, relay 149 closes a switch 155 connected to the feed line 121 by wires 156 and 158 to a terminal 159 leading to the tool units to initiate their operations. At the same time, relay 149 closes a switch 160 of a holding circuit including wires 161 through a switch 162 of a relay 163 and switch 64 of the timing mechanism so that the tool control circuit will remain effective until the lapse of a predetermined time.

When the switches 65 are operated at the end of the advancement of the pallets in the row 15a, they also close a circuit including wire 164 and a closed switch 165 of a relay 16. The switch 165 connects to coil 50a of the solenoid valve 50 which causes the feed lugs 34 to be swung down clear of the pallets. When the lugs are clear, switches 66 are closed and they close a circuit including the wires 167 leading to the relay 166 whose operation opens the switch 165 and deenergizes coil 50a of the solenoid valve 50. Also, the switches 66 energize the coil 47b of the solenoid valve 47 to return the feed rods 29 to starting position.

Return of rods 29 closes switches 67 to energize coil 50b through wire 169 which causes the lugs 34 to be moved to operative position.

The switches 66 which are closed when the lugs 34 are clear of the pallets also closes a circuit including wire 170, switches 68 and wire 172 leading to the coil 53a of the solenoid valve 53 which cause the piston rods 45 and lugs 44 to advance the pallets in the rows 15a. When this movement is completed, the circuit through wire 170 and coil 53a is opened by switches 68 and another circuit through switches 68, wire 173 and coil 53b is closed to immediately and automatically return the feed lugs 34 to starting position.

At this point in the cycle of operations, all the switches 66a, 67 and 68a have been closed. However, the reclosing of the switch 67, which controls the advancing movement of the pallets in the row 15a, does not repeat the cycle of the feeding operations because in the meantime solenoid 150 has dropped out and the holding circuit, including the switch 160 and the timing contact 64, remain closed, and this condition is maintained until the end of the predetermined time controlled by the timing motor.

The present invention makes provision for automatically rendering the machine inoperative under two conditions—one, in the event that the feeding operation of the pallets for some reason takes too long, and the other if for some reason the tool units do not operate as intended and in the time required.

Referring now to the means for rendering the machine inoperative in the event the transfer mechanism fails to operate properly, the present invention provides a time delay relay 174 which is energized simultaneously with the coil 47a which causes the advancing movement of the feed rods 29 to position the pallets and the work thereon properly with regard to the tool units T. The energization of the relay 174 causes the closing of a switch 175 connected by wires 176 to relay 135 which, upon energization, opens the holding circuit 134 and permits the main relay 136 to drop out and open all of the circuits. At the same time the relay 135 closes a switch 177 in a holding circuit including wires 178 leading back to the stop button of the stop-and-start switch 130. As a consequence, once the circuits controlled by the feed line 121 have been opened by the main relay 136, they remain open until a manual operation has been performed—this being the operation of the stop button of the stop-and-start switch 130. At the same time, a lamp 179 in circuit with the relay 135 is energized to indicate a faulty condition.

As will be pointed out below, the tool units T may be provided with sensing switches which are operated when the tools have been returned to their proper positions at the end of a tooling operation, and these switches are connected by wires in the receptacles 104 which in turn are connected to the panel board—the receptacle 104 being diagrammatically indicated in FIG. 16.

The wire 180 from the receptacle 104 is connected to the sensing switches on the tooling, and unless current is flowing through the wire 180 to the relay 146 the latter will not be energized, and the switch 145 which has been described above as a normally closed switch will not be closed and a switch 181 will be closed. The closing of the switch 181 sets up a condition through wires 167 which lead to the relay 135 so that when the switch 63 operated by the timing mechanism is closed to initiate a new cycle of operations, the relay 135 will be energized and cause switch 134 to open, rendering the main relay 136 ineffective as pointed out above in connection with the other fault-sensing system. At the same time, the fault-indicating lamp 179 is energized. It will be understood, of course, that all of the sensing switches on the tool units are in series so that if any one of them is not closed at the end of the tooling operation, the circuit leading through the wire 180 and relay 146 will remain open.

In the operation of a machine tool involving transfer mechanism and multiple tool units, it is advantageous in adjusting the tools and the pallet-advancing mechanism to inch or jog the mechanism so that the successive operations can be observed conveniently.

For the purpose of permitting this to be done, the present invention provides the switch 145 which is a manually operated switch and which has three positions— an off position indicated at 182, an automatic position indicated at 183, and a manual position indicated at 184. When the switch 145 is shifted to its manual operating position 184, the feed line 121 is connected by a wire 185 to the relay 163 which operates the switch 162 to open the timer circuit controlled by the switch 64 of the timing mechanism. At the same time, the wire 144 is connected by the switch 145 to a wire 186 leading to a jogging switch 187 which, when manually held closed, connects the wire 144 through wire 186 to a wire 188 and wire 146 leading to the switch 63 of the timing mechanism. The switch 63, it will be recalled, starts the operation of the mechanism, hence the jog button 187 will substitute for the start timing switch 63. When the jog button is operated, another contact thereon connects the wire 184 to a wire 189 and this substitutes for the stop timing switch 64. Hence, while the jog button is held depressed, the pallet-advancing mechanism operates in the same manner as it did under automatic operation but for one cycle only because the relay 149 will prevent a repeated pallet-advancing cycle the same as it would if the switch 145 were in "automatic" position.

According to the present invention, provision is made for operating the tool units T under the control of the jog button 187 along with the pallet-advancing means or operating the pallet-advancing means alone. When it is desired to operate the pallet-advancing means but not the tool unit T, a switch 190 in the line 158 is opened before the jog button 187 is operated.

When it is desired to advance the pallets in the rows 15a in small increments of movement under manual control, inching mechanism provided by the present invention may be employed. The inching mechanism shown includes a manually operable spring-returned push button switch 191 having a contact 191a which is connected to the feed line 121 by a wire 192 and is connected to the series of feed-rod return switches 67, 66a and 68a between the switches 67 and 66a to shunt out the latter.

In addition, the inching switch 191 has another contact 191b which is connected by a wire 193 to an inching valve coil 194, and the other side of the contact 191b is connected by a wire 195 to a switch 196 operated by the relay 163 and current flows from the switch 196 thereof through a wire 197 which connects to the junction of switches 66a and 68a which in turn are connected to the feed wire 121. If the feed lugs 34 are not in pallet-engaging position, the switches 66a will be open and the inching mechanism will be inoperative.

The coil 194 operates a spring-returned solenoid valve which bypasses the solenoid valve 47 and supplies fluid to the pipe 48 of the cylinder 33 which advances the pallets in the rows 15a.

Referring to the receptacle 104 shown in FIG. 16, a wire 198 is connected to the feed line 120 to supply current for the sensing switches on the tool units. Wires 199 are connected to a source of power for the tool units such as an electric motor continuously operating a hydraulic pump forming part of the tool units, and this current may be supplied either from the lines 116 or from a transformer fed by the lines 116. The wire 200 is used to ground the equipment.

The timing motor 60 as above stated is a variable speed motor and is controlled by a potentiometer 201. When the switches 114, 122 and 130 have been closed and the machine is ready to operate, a lamp 202 connected across the relay 136 is energized. A lamp 203 connected across the relay 125 indicates when the hydraulic pump motor 127 is operating.

In order to permit the machine to be instantly stopped should any accident or malfunctioning occur, the present invention provides a cable 204 which on suitable brackets 205 is stretched across both sides of the machine and directly above the ways 15. At one end of the machine the cables are anchored to the brackets 205 and at the other end of the machine the cables are connected to switches 131 and 132 respectively. The cable is maintained taut by springs 206. It will be remembered that the switches 131 and 132 are connected in series in the circuit leading to the main relay 136, and therefore when either cable 204 is struck or leaned against, the safety switches 131 or 132 will be opened and the machine stopped.

The number and location of the sensing switches which are in series and are connected to the wire 180 depend upon the particular tool units used and the operations being performed. As representative of one arrangement, the sensing switches shown in FIG. 5 in connection with the vertical drilling tool unit T1, include a sensing switch 207 which is operated by a rod 208 connected to a carriage 83. Also in FIG. 5 in connection with the horizontal tap unit T2, there is shown a sensing switch 209 operated by a rod 210 operated by the carriage 211 of the unit.

Usually, the cable 106 connected to the attachment plug 105 extends to a control box 212 having means for individually controlling the tools of each tool unit. From the control box a cable 213 extends to a junction box 214 which terminates the wiring from the sensing switches and various other parts of the tooling.

It will be seen from the above that all that needs to be done to adapt the machine to the present invention for any particular machining, assembling or other operation is to prepare appropriate work nests on the pallets, select the needed self-powered tool units, mount them in position along the track, plug them into one of the electrical receptacles placed at convenient points along the machine, and finally adjust the variable speed timing motor to select the desired time interval during which one complete cycle of operations should be performed.

This is accomplished by the present invention by having permanently built into the machine the work-advancing means, including the automatic controls therefor, and the electrical system for automatically initiating the operation of the tool units and for preventing faulty operation by interrupting the operation of the machine should it fail to operate as intended.

Instead of having the conduit 102 located in the channel 101 in the top plate 13 as shown in FIG. 5 for instance, it may be mounted on the surface of the top plate or at considerable height above the top plate.

For instance, as shown in FIG. 18, the conduit 102a carrying the plug receptacles 104 may be mounted on brackets 215 carried on the end sections 11 of the machine and extending substantially over the top plate 13. The conduit 102 may have a casing 216 carrying various signal lamps. By having the conduit 102a located well above the top 13, the danger of short-circuiting, due to the presence of water and other conductive fluids which may be used in the operation of the machine, is avoided.

It should be noted that, according to the present invention, by starting the operation of tool units immediately upon the pallets in the rows 15a reaching advanced position, the time required for one complete cycle of the machine is substantially shortened. This is because the advancement of the pallets in the rows 15a occurs almost instantaneously, the remaining operations of the pallet-advancing mechanism taking place while the tool units are operating. The output of the machine per unit of time is thus substantially increased.

In multi-operation machine tools as heretofore provided, when it was desired to change the length of time during which the machine completed one cycle, not only the working time was changed but also the time required for indexing, i.e., advancing the work.

According to the present invention, however, while the length of the cycling period of the machine may be varied by the single control as represented by the potentiometer 201, the change of speed of the timing motor does not change the length of time during which the transfer mechanism operates, since the transfer mechanism operates independently, although within the complete cycling time. The present invention therefore avoids the loss of time heretofore unavoidably involved by not unnecessarily lengthening the time within which the transfer mechanism operates.

The term "machining operations" as herein used is intended to include all operations which change the shape or form of a workpiece whether by cutting, swaging, grinding, spinning, or other similar operations.

The term "assembling operation" as herein used is intended to include all operations in which several pieces are brought together to form an assembly, whether or not the pieces so brought together are joined as one.

In addition to being useful for machining, assembling and finishing operations, the machine tool of the present invention may also be used for measuring or inspecting workpieces, and measuring tool units may, of course, be used along with assembling, machining or finishing tool units.

Variations and modifications may be made within the scope of the claims and portions of the improvements may be used without others.

We claim:

1. A machine for supporting and moving a plurality of workpieces past potential work stations on opposite sides of the machine for sequence operations thereon, comprising a frame, a worktable supported on said frame and having a horizontal rectangular tool-supporting surface which is substantially planar and continuous and provided with an endless marginal gap therein, said marginal gap being rectangular and having side portions and end portions adjacent to but spaced inwardly from and parallel with the sides and ends respectively of the worktable; a plurality of like rectangular work pallets arranged in said gap in side-by-side relation forming spaced straight side rows and end rows each row having a plurality of pallets, said pallets overlying said gap and substantially filling the same to complete said work surface except for voids at two diagonally opposite corners of the marginal gap, said pallets in opposite side rows being slightly spaced to enable individual registration thereof at said work stations, and said pallets in said end rows being in abutting relation; tracks in the side portions and end portions of the gap to slidably support said pallets with their work surfaces in substantially the horizontal plane of said worktable; means for advancing the pallets simultaneously in both said side portions of the gap and located below each side row of pallets and comprising reciprocating means for individually engaging each pallet in each of said side rows to advance each pallet in each side row simultaneously and intermittently a distance substantially equal to the width of each pallet to a potential work station on the worktable whereby each pallet in the side rows is selectively available for use to carry work and is positively advanced in sequence from one potential work station on the worktable to a succeeding contiguous potential work station at each operation of the advancing means, reciprocating means for advancing the pallets of each of said end rows comprising reciprocating means positioned to engage only the last pallet to enter the end row and by edge-to-edge engagement of the pallets to advance all of the pallets in each end row en masse to position the leading pallet in the end row in the void in the opposite side row and to present the opposite side of each pallet to the exterior of the table whereby opposite sides of workpieces supported on said pallet are made accessible from the opposite exterior side of the worktable; and means for alternately operating the means for advancing the pallets in the side rows and the means for advancing the pallets in the end rows, the portion of the worktable bounded by and adjacent each side portion of the endless marginal gap being sufficiently extensive to provide a substantial work surface whereby workpieces and tools may be supported thereby at said work stations.

2. A machine as set forth in claim 1 in which the means for advancing the pallets in each side row of pallets comprises a longitudinally movable and rotatable rod extending along the track beneath the row of pallets and having a plurality of aligned lugs each lug being positioned to engage and disengage one pallet in the row, means for advancing and retracting each rod to advance each pallet from one work station on the worktable to the next when the rod is advanced, means responsive to the completion of the advancing movements of the rods for rotating the rod to disengage the lugs from the pallets, and means responsive to the return of the rod to starting position when retracted for causing the rod to be rotated to cause the lugs to reengage the pallets and means for rendering the pallet-advancing means inoperative upon failure of said feeding lugs properly to return to pallet-engaging positions.

References Cited by the Examiner

UNITED STATES PATENTS

| | | | |
|---|---|---|---|
| 1,738,039 | 12/1929 | Cope | 214—16.1 |
| 1,851,502 | 3/1932 | Ferris | 198—85 X |
| 2,201,939 | 5/1940 | Auger | 214—16.1 X |
| 2,745,167 | 5/1956 | Cross | 29—33 |

EVON C. BLUNK, Primary Examiner.

EDWARD A. SROKA, Examiner.